March 2, 1926.
L. E. GREINER, JR
1,575,262
SKIN THERMOMETER
Filed May 22, 1923
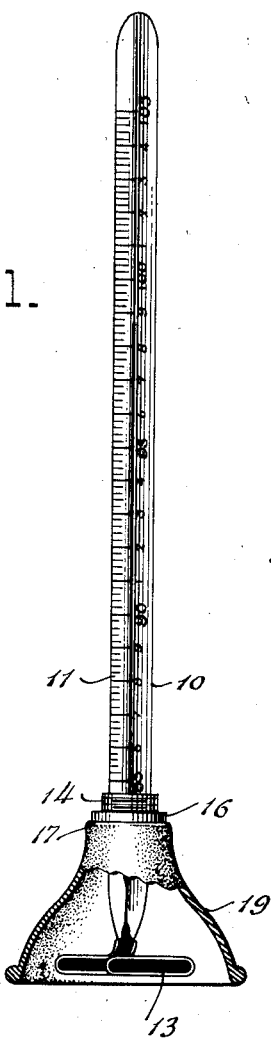
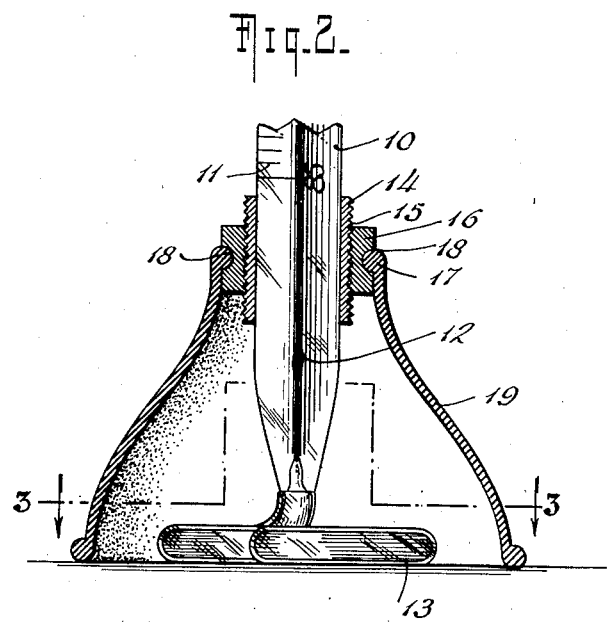
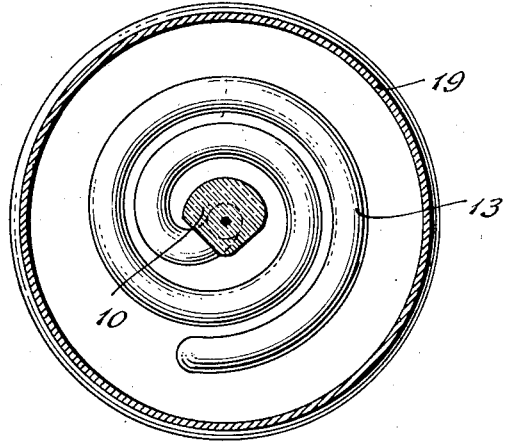
INVENTOR
LEOPOLD E. GREINER JR
BY Richards & Geier.
ATTORNEYS Patented Mar. 2, 1926.

1,575,262

UNITED STATES PATENT OFFICE.

LEOPOLD E. GREINER, JR., OF BRONX, NEW YORK.

SKIN THERMOMETER.

Application filed May 22, 1923. Serial No. 640,668.

*To all whom it may concern:*

Be it known that I, LEOPOLD E. GREINER, Jr., a citizen of the Republic of Germany, residing at Bronx, county of Bronx, and State of New York, have invented certain new and useful Improvements in Skin Thermometers, of which the following is a specification.

In the observation diagnosis and treatment of certain classes of human ailments and diseases, it is frequently of great value to be able to accurately ascertain the temperature of certain local portions of the body such as for example, to determine the seat of local inflammations in any part of the body or as in chiropractery, portions adjacent certain vertebræ of the spinal column and as these portions present merely a substantially plane area of skin, the ordinary clinical thermometer is of little or no value for taking the temperature thereof. As far as I am aware no one heretofore has devised a satisfactory thermometer adapted to ascertain with accuracy the temperature of a local portion merely by superficial contact of the instrument with the skin and therefore it is the principal object of this invention to provide a skin thermometer by means of which local temperatures may be ascertained by merely holding the thermometer against the skin of the patient.

Another object is to provide a shield to prevent air currents from striking the mercury bulb while a temperature is being taken.

A further object is to provide means for holding the thermometer in position upon the skin.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claim hereunto appended.

In the drawings forming a portion of this specification—

Fig. 1 is an elevation partly in section of a thermometer embodying my invention.

Fig. 2 is an enlarged central partial section of the lower end of the device showing the thermometer bulb in contact with a surface under observation and Fig. 3 is a section on the line 3—3 of Fig. 2.

As shown in the drawings, the numeral 10 designates the stem portion of the thermometer, the cross sectional area of which is of the usual prismatic shape commonly used for clinical thermometers, and it is provided with the graduations or scale 11. The scale is graduated in fifths of a degree according to the usual practice and the corresponding numeral is preferably placed adjacent each whole graduation. The customary contraction 12 is provided adjacent the base of the stem to prevent the mercury from retreating into the bulb by contraction and thereby provide a maximum thermometer upon which the last reading is maintained until the mercury is driven back into the bulb as by shaking the instrument in the usual manner.

Attached to the base of the stem 10 is a bulb 13 consisting of a length of glass tubing wound into a spiral form, so as to provide a relatively large contact area upon its lower face and the cross sectional area of the bulb is of comparatively small diameter preferably so proportioned to the length of the spiral as to make the volume of mercury required to be used substantially equal to that used for the ordinary clinical thermometer.

Secured to the outside of the stem 10 adjacent its lower end is a sleeve 14 preferably cemented to the stem and constructed of hard rubber or any suitable fibrous material which will withstand the action of the commonly used antiseptic solutions. The exterior of the sleeve 14 is screw threaded as at 15 to engage within the screw threaded bore of a collar 16 which is suitably secured as by means of the cooperating bead 17 and groove 18 to a combined vacuum cup and shield 19 constructed of any suitable resilient flexible material such as rubber.

The manner of using the device is as follows:—

The thermometer is screwed upwardly to draw the bulb up into the combined vacuum cup and shield, the lower rim of which is then placed against the skin of the patient at the desired point, and the cup is depressed by pushing downwardly upon the stem to partially expel the air from within the cup, and thereby form a vacuum within the cup which will cause the atmospheric pressure on the outside of the cup to hold the device securely in position according to the well known properties of devices of this character. The stem of the thermometer is now rotated to screw the sleeve downwardly into the collar until the lower face of the bulb is in contact with the skin. As the bulb will now be completely enclosed within the shield in a small substantially air tight chamber, the temperature within the chamber will be quickly brought to the temperature of that portion of the skin within the shield and as there can be no cooling of the bulb caused by air currents, the temperature will be quickly and accurately registered by the thermometer. When the device has been kept in position a sufficient length of time to obtain the proper reading it may be readily removed by merely pulling outwardly upon the stem to detach the cup.

Having thus described my invention, what I claim as new and desire to secure by Letters Patent of the United States is:

A clinical skin thermometer including a bulb capable of being engaged with the skin, a graduated stem projecting from said bulb, an externally screw threaded sleeve secured to said stem adjacent said bulb, an internally screw threaded collar for receiving said sleeve and with respect to which the latter is longitudinally movable when said stem is rotated relative to the collar, and a flexible shield carried by said collar and capable of contact with the skin to form a chamber for said bulb from which air may be expelled by a depression of said shield when the bulb is retracted within the shield to a point adjacent said collar by rotation of said stem in one direction, the stem and sleeve being thereafter rotatable in an opposite direction to engage said bulb with the skin.

In testimony whereof I have affixed my signature.

LEOPOLD E. GREINER, Jr.